United States Patent [19]
Langen et al.

[11] Patent Number: 4,893,707
[45] Date of Patent: Jan. 16, 1990

[54] CHAIN CONVEYORS

[75] Inventors: Marinus J. M. Langen, Toronto; Peter Guttinger, Milton, both of Canada

[73] Assignee: H. J. Langen & Sons Limited, Mississauga, Canada

[21] Appl. No.: 271,690

[22] Filed: Nov. 16, 1988

[51] Int. Cl.⁴ .............................................. B65G 15/14
[52] U.S. Cl. ................................ 198/627; 198/803.11; 198/803.13
[58] Field of Search ............. 198/473.1, 484.1, 803.11, 198/803.13, 627, 570

[56] References Cited

U.S. PATENT DOCUMENTS 3,198,316 8/1965 Bivans ................................ 198/473.1
3,325,977 6/1967 Kirsten .................................. 198/627
3,779,364 12/1973 Kammann ...................... 198/803.11
3,809,210 5/1974 Anderson ....................... 198/803.11
4,152,960 5/1979 Detjen .................................. 198/627
4,353,276 10/1982 Ackerfeldt ........................... 198/570

Primary Examiner—Joseph E. Valenza
Attorney, Agent, or Firm—Fetherstonhaugh & Co.

[57] ABSTRACT

A conveyor mechanism of the type having a pair of conveyor chains which have co-extensive portions of their length which are guided by guide tracks so as to extend along a conveyor path in close proximity to one another, the improvement wherein the guide tracks are arranged one above the other in an overlapping relationship and the load confining members which are conveyed by the chains are arranged to extend in first and second load confining planes which are laterally spaced from one another by an amount which is less than the lateral width of the second conveyor chain thereby to provide a narrow array of load confining members along an edge of the conveyor path.

6 Claims, 2 Drawing Sheets

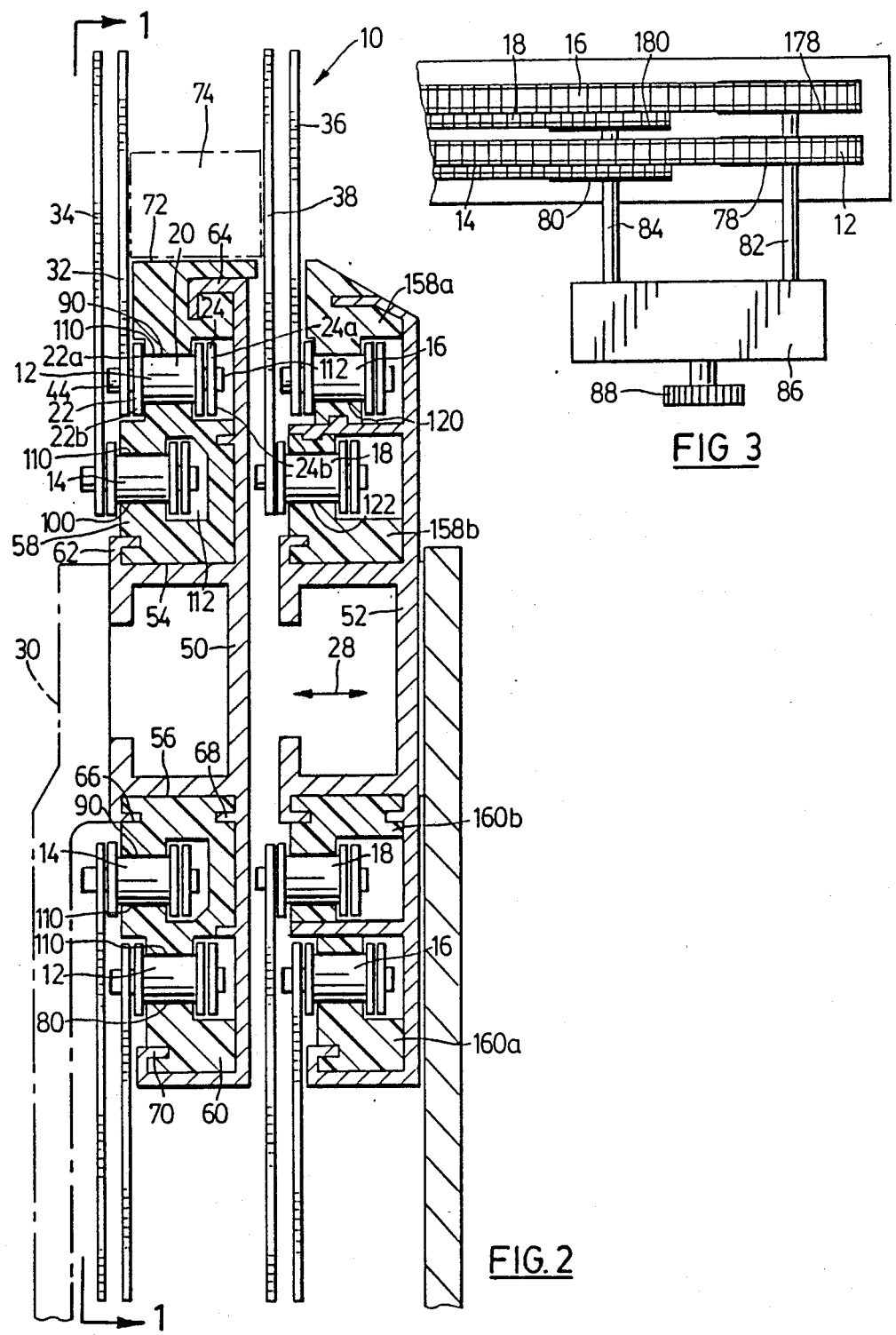

CHAIN CONVEYORS

BACKGROUND OF THE INVENTION

This invention relates to conveyors. In particular, this invention relates to conveyor mechanisms of the type which have load confining members which project upwardly from conveyor chains into the conveyor path and are used for transporting load items along the conveyor path.

Load confining members are used in association with chain conveyors for supporting cartons and the like in an open configuration to facilitate the end loading of the carton as it is transported along a conveyor path. Difficulty has been experienced in using this type of conveyor mechanism in association with small cartons because in the conventional chain conveyor mechanism, the two chains which are provided at each side of the conveyor path are arranged in a side-by-side relationship and consequently, there is a substantial lateral space between the blades of the load confining members which are carried by one chain and the blades which are carried by the other chain. Generally, the lateral spacing between these blades is equal to at least the thickness of one chain.

SUMMARY OF THE INVENTION

We have found that it is possible to construct a conveyor mechanism in which the adjacent load confining members are located more closely adjacent one another by arranging the chains and their associated guide tracks so that they are located one above the other in an overlapping position rather than in a side-by-side position.

According to one aspect of the present invention, there is provided in a conveyor mechanism for transporting articles along a conveyor path, the conveyor being of the type having first and second conveyor chains which have co-extensive portions of their length which are guided by first and second guide tracks respectively so as to extend along the conveyor path in close proximity to one another, each chain having first and second side edges and first and second load confining members mounted on the first side edges of the first and second chains respectively for movement therewith along the conveyor path, the improvement wherein said first guide track is located more closely adjacent the conveyor path than the second guide track and said first and second guide tracks are arranged one above the other in an overlapping relationship with the first side edge of the first guide track being spaced laterally inwardly from the first side edge of the second guide track such that the first and second load confining members are arranged to extend in first and second load confining planes which are laterally spaced from one another by an amount which is less than the lateral width of said second conveyor chain thereby to provide a narrow array of load confining members along an edge of said conveyor path.

According to a further aspect of the present invention, there is provided in a conveyor mechanism for transporting articles along a conveyor path, the conveyor being of the type having first and second conveyor chains which have co-extensive portions of their length which are guided by first and second guide tracks respectively so as to extend along a first edge of said conveyor path in close proximity to one another, said first and second chain having first and second side edges and first and second load confining members mounted on the first side edges of the first and second chains respectively for movement therewith along the conveyor path, third and fourth conveyor chains which have co-extensive portions of their length which are guided by third and fourth guide tracks respectively so as to extend along a second edge of said conveyor path in close proximity to one another, said third and fourth chains having first and second side edges and third and fourth load confining members mounted on the first side edges of the third and fourth chains respectively for movement therewith along the conveyor path, the improvement wherein said first guide track is located more closely adjacent the conveyor path than the second guide track and said first and second guide tracks are arranged one above the other in an overlapping relationship with the first side edge of the first guide track being spaced laterally outwardly from the first side edge of the second guide track such that the first and second load confining members are arranged to extend in first and second load confining planes which are laterally spaced from one another by an amount which is less than the lateral width of said second conveyor chain thereby to provide a first narrow array of load confining members along a first edge of said conveyor path and said third guide track is located more closely adjacent the conveyor path than the fourth guide track and said third and fourth guide tracks are arranged one above the other in an overlapping relationship with the first side edge of the third guide track being spaced laterally outwardly from the first side edge of the fourth guide track such that the third and fourth load confining members are arranged to extend in third and fourth load confining planes which are laterally spaced from one another by an amount which is less that the lateral width of said fourth conveyor chain thereby to provide a second narrow array of load confining members along a second edge of said conveyor path.

BRIEF DESCRIPTION OF THE DRAWINGS

The invention will be more clearly understood after reference to the following detailed specification read in conjunction with the drawings wherein;

FIG. 2 is a sectional view taken along the line 2—2 of FIG. 1, FIG. 3 is a plan view of a portion of the conveyor assembly of FIG. 1.

With reference to FIGS. 1 and 2 of the drawings, the reference numeral 10 refers generally to a conveyor mechanism constructed in accordance with an embodiment of the present invention.

As shown in FIG. 2 of the drawings, the conveyor mechanism includes a first endless conveyor chain 12, a second endless conveyor chain 14, a third endless conveyor chain 16 and a fourth endless conveyor chain 18. Each of the chains has a plurality of roller members 20 and link members 22 and 24, the link members 22 being located along a first side edge of each chain and the link members 24 being located along the second side edge of each chain. The link members 22 and 24 have opposite edge portions 22a, 22b and 24a, 24b, which project radially outwardly from their associated roller 20.

Figure 1:
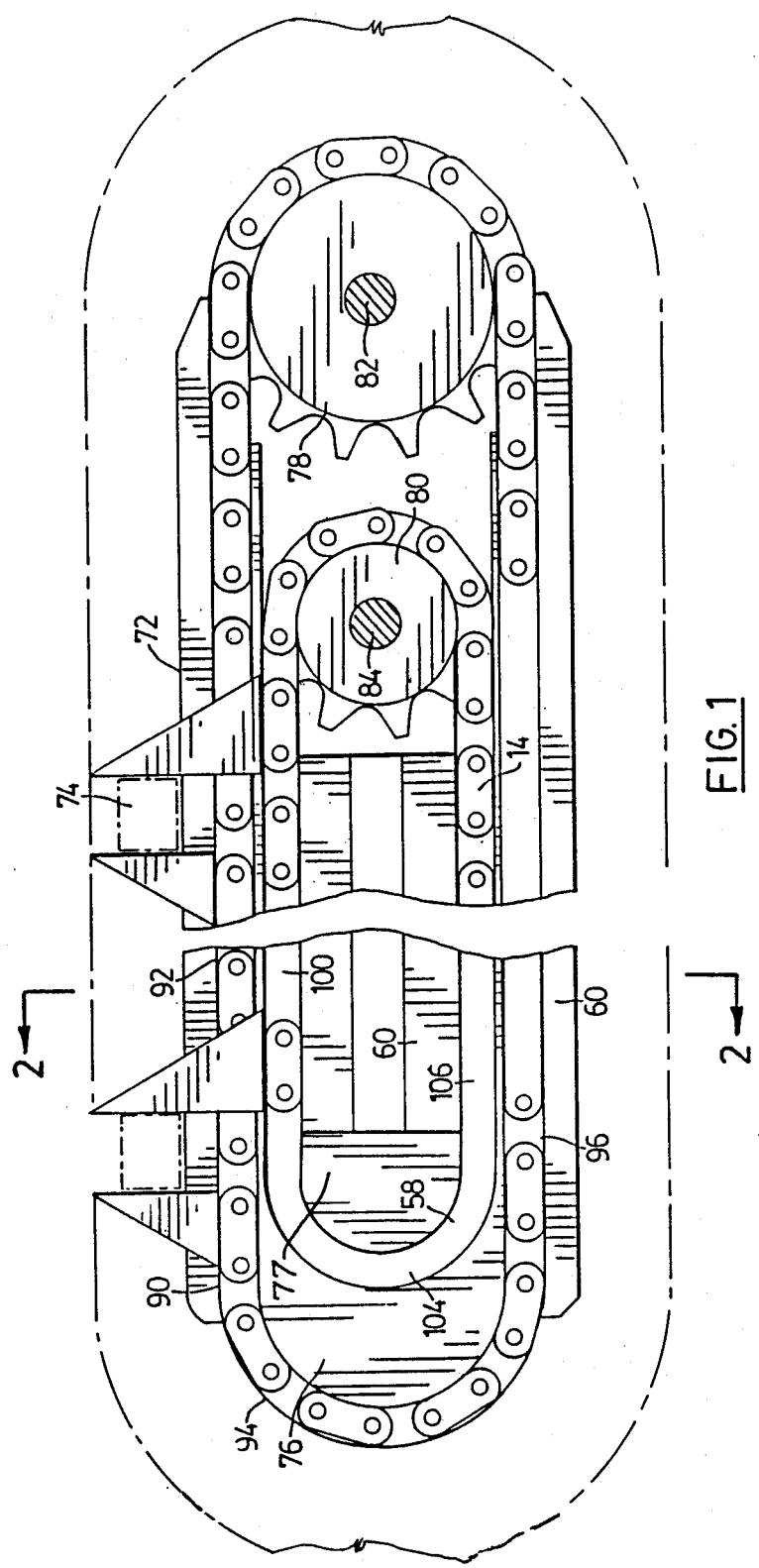
FIG. 1 is a side view of the conveyor mechanism of FIG. 2 taken along the line 1—1.

Load confining members 32 are mounted at the first side edge of the first chain 22 and project upwardly therefrom. The load confining members 32 are in the form of a triangular-shaped plate which has a leading edge 42 and a trailing edge 43. The plate 32 is mounted on the shafts 44 of the chain for movement therewith.

Second load confining members 34 are mounted on the chain 14. Similarly, third and fourth load confining members 36 and 38 are mounted on the chains 16 and 18 respectively.

A frame which is generally identified by the reference numeral 50 is provided which serves to support both the forward and the return runs of the first and second chains 12 and 14. A similar frame 52 is provided for supporting the forward and return runs of the chains 16 and 18.

The frame 50 is formed with an upper seat 54 and a lower seat 56. An upper guide track member 58 is located in the upper seat 54 and a lower guide track member 60 is located in the lower seat 56. The upper guide track member 56 and lower guide track member 60 are each formed from a material which has a low co-efficient of friction such as a plastics material and are anchored in their respective seats by means of lugs 62, 64, 66, 68 and 70 which extend into complimentary recesses which are formed in the body of the guide track members.

The upper guide track member 58 has an upper face 72 which forms a load support face along which load items 74 are conveyed in a conveyor path.

A corner piece 76 (FIG. 1) is mounted at one end of the frame 50 and a sprocket 78 is mounted at the other end of the frame on a shaft 82. A similar corner piece 77 is mounted on the frame 50 and is located inwardly from the corner piece 76. A sprocket 80 is mounted on the shaft 84 which is located inwardly from the shaft 82. The shafts 82 and 84 are driven through a gearbox 86 from a power input 88.

A first guide track 90 has a first portion of its length 92 extending along the upper guide track member 58, a second portion of its length 94 extending around the corner piece 76 and a third portion of its length 96 extending along a lower guide track member 60. The first conveyor chain 12 is slidably mounted in the first guide track 90 and also extends around the sprockets 78.

The second guide track 100 has a first portion of its length 102 extending along the upper guide track member 58, a second portion of its length 104 extending around the corner piece 77 and a third portion of its length 106 extending along the lower guide track member 60. The second conveyor chain 14 is mounted for movement along the second guide track 100 and is mounted on the sprocket 80.

The first and third portions of the first and second guide tracks 90 and 100 are each formed with a guide channel 110 which extends inwardly from the side face thereof. The guide channels 110 are proportioned to receive the roller members 20 in a close-fitting rolling relationship while serving to prevent the lateral removal of the chains by reason of the fact that these channels will not permit the links 24 to be removed laterally therethrough. The second sections 112 of the channels 110 are proportioned to accommodate the links 24 including their edge portions 24a, 24b.

The first guide track 100 is located more closely adjacent the upper face 74 which forms the conveyor path than is the second guide track 110. The first guide track 90 is also located laterally inwardly from the first guide track 100. This arrangement permits the load confining members 32 and 34 to be located in planes which are located closely adjacent one another.

The frame 52 serves to support two upper guide track members 158a and 158b and two lower guide track members 160a and 160b. Third guide tracks 120 and 122 are formed in the guide track members 158a and 160a and fourth guide tracks 122 are formed in the guide track members 158b and 160b, respectively. The third and fourth chains 16 and 18 are mounted in the guide tracks 120 and 122 respectively and are driven by sprockets 178 and 180 respectively. Again, this arrangement permits the load confining members 36 and 38 to extend in spaced parallel planes which are located in close proximity to one another.

In use, the frame 50 is mounted on a support structure 30 which can be laterally displaced with respect to the frame 52 to and fro in the direction of the arrows 28 so as to accommodate load items 74 of different lengths. It will also be apparent that the position of the load confining members 32 with respect to the load confining members 34 may be adjusted by moving the first chain 12 with respect to the second chain 14 in the longitudinal direction to accommodate loads of different width.

From the foregoing, it will be apparent that the conveyor mechanism of the present invention is capable of adjustment to permit it to transport loads which are relatively short such as small cartons for containing small items such as small bottles for containing small quantities of aspirin or the like. This results from the fact that the load confining members may be arranged to extend in load confining planes which are located closely adjacent one another and this in turn results from the fact that the chains which support the load confining members are not arranged in a side-by-side relationship but are rather located one above the other with only a slight lateral offset of one with respect to the other.

We claim:

1. In a conveyor mechanism for transporting articles along a conveyor path, the conveyor being of the type having first and second conveyor chains which have co-extensive portions of their length which are guided by first and second guide tracks respectively so as to extend along the conveyor path in close proximity to one another, each chain having first and second side edges and first and second load confining members mounted on the first side edges of the first and second chains respectively for movement therewith along the conveyor path, the improvement wherein;
    (a) said first guide track is located more closely adjacent the conveyor path than the second guide track and said first and second guide tracks are arranged one above the other in an overlapping relationship with the first side edge of the first guide track being spaced laterally inwardly from the first side edge of the second guide track such that the first and second load confining members are arranged to extend in first and second load confining planes which are laterally spaced from one another by an amount which is less than the lateral width of said second conveyor chain thereby to provide a narrow array of load confining members along an edge of said conveyor path.

2. In a conveyor mechanism as claimed in claim 1 wherein the chains each have a plurality of roller members extending transversely between first and second side link members which extend along first and second side edges thereof respectively, each link member having end portions which project radially outwardly from their associated roller member, the further improvement wherein the first and second guide tracks each comprise a channel which has an open end which opens laterally from one side thereof, each channel having a first section extending inwardly from the open end thereof which is proportioned to accommodate the roller members of the chain in a close fitting rolling relationship and a second section which is located laterally inwardly from the first section, said second section being proportioned to accommodate the end portions of the link members which extend along the second side edges thereof, said first section being proportioned to prevent lateral removal of the end portions of the link members such that the chains are restricted to longitudinal movement along their respective channels.

3. In a conveyor mechanism for transporting articles along a conveyor path, the conveyor being of the type having first and second conveyor chains which have co-extensive portions of their length which are guided by first and second guide tracks respectively so as to extend along a first edge of said conveyor path in close proximity to one another, said first and second chain having first and second side edges and first and second load confining members mounted on the first side edges of the first and second chains respectively for movement therewith along the conveyor path, third and fourth conveyor chains which have co-extensive portions of their length which are guided by third and fourth guide tracks respectively so as to extend along a second edge of said conveyor path in close proximity to one another, said third and fourth chains having first and second side edges and third and fourth load confining members mounted on the first side edges of the third and fourth chains respectively for movement therewith along the conveyor path, the improvement wherein;

(a) said first guide track is located more closely adjacent the conveyor path than the second guide track and said first and second guide tracks are arranged one above the other in an overlapping relationship with the first side edge of the first guide track being spaced laterally outwardly from the first side edge of the second guide track such that the first and second load confining members are arranged to extend in first and second load confining planes which are laterally spaced from one another by an amount which is less than the lateral width of said second conveyor chain thereby to provide a first narrow array of load confining members along a first edge of said conveyor path and (b) said third guide track is located more closely adjacent the conveyor path than the fourth guide track and said third and fourth guide tracks are arranged one above the other in an overlapping relationship with the first side edge of the third guide track being spaced laterally outwardly from the first side edge of the fourth guide track such that the third and fourth load confining members are arranged to extend in third and fourth load confining planes which are laterally spaced from one another by an amount which is less that the lateral width of said fourth conveyor chain thereby to provide a second narrow array of load confining members along a second edge of said conveyor path.

4. In a conveyor mechanism as claimed in claim 3 wherein the chains each have a plurality of roller members extending transversely between first and second side link members which extend along first and second side edges thereof respectively, each link member having end portions which project radially outwardly from their associated roller member, the further improvement wherein the first, second, third and fourth guide tracks each comprise a channel which has an open end which opens laterally from one side thereof, each channel having a first section extending inwardly from the open end thereof which is proportioned to accommodate the roller members of the chain in a close fitting rolling relationship and a second section which is located laterally inwardly from the first section, said second section being proportioned to accommodate the end portions of the link members which extend along the second side edges thereof, said first section being proportioned to prevent lateral removal of the end portions of the link members such that the chains are restricted to longitudinal movement along their respective channels.

5. A conveyor mechanism as claimed in claim 3 wherein said first and second guide tracks are each formed in a first guide rail and said second and third guide tracks are each formed in a second guide rail, said first and second guide rails extending in a spaced parallel relationship and being mounted for lateral movement with respect to one another to vary the effective width of the conveyor.

6. In a conveyor mechanism for transporting articles along a conveyor path, the conveyor being of the type having first and second conveyor chains which have co-extensive portions of their length which are guided by first and second guide tracks respectively so as to extend along the conveyor path in close proximity to one another, each chain having a plurality of roller members extending transversely between first and second side link members which extend along first and second side edges thereof respectively, each link member having end portions which project radially outwardly from their associated roller member, first and second load confining members mounted on the first and second chains respectively for movement therewith along the conveyor path, the improvement wherein;

(a) said first guide track is located more closely adjacent the conveyor path than the second guide track and said first and second guide tracks are arranged one above the other in an overlapping relationship with the first side edge of the first guide track being spaced laterally inwardly from the first side edge of the second guide track such that the first and second load confining members are arranged to extend in first and second load confining planes which are laterally spaced from one another by an amount which is less that the the lateral width of said second conveyor chain thereby to provide a narrow array of load confining members along an edge of said conveyor path.

* * * * *